US006339818B1

(12) United States Patent
Olszewski et al.

(10) Patent No.: US 6,339,818 B1
(45) Date of Patent: Jan. 15, 2002

(54) METHOD AND SYSTEM FOR DYNAMICALLY LOCATING FREQUENTLY ACCESSED MEMORY REGIONS OR LOCATIONS

(75) Inventors: Bret Ronald Olszewski; Edward Hugh Welbon, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,711

(22) Filed: Jun. 24, 1999

(51) Int. Cl.[7] .............................................. G06F 12/00
(52) U.S. Cl. ...................................... 711/173; 711/133
(58) Field of Search ................................. 711/170, 173, 711/133

(56) References Cited

U.S. PATENT DOCUMENTS 5,903,915 A * 5/1999 Inman ........................ 711/167

* cited by examiner

Primary Examiner—Matthew Kim
Assistant Examiner—C. P. Chace

(74) Attorney, Agent, or Firm—Duke W. Yee; Volel Emile

(57) ABSTRACT

A method and system for monitoring the performance of a processor to detect a set of frequently accessed memory items is provided. A memory region to be monitored is selected and divided into an upper half monitored memory region and a lower half monitored memory region. Memory accesses to the upper half monitored memory region and memory accesses to the lower half monitored memory region are counted during a measurable interval. In response to the count of memory accesses to the upper half monitored memory region being greater than the count of memory accesses to the lower half monitored memory region, the monitored memory region is updated to be equal to the upper half monitored memory region. In response to the count of memory accesses to the lower half monitored memory region being greater than the count of memory accesses to the upper half monitored memory region, the monitored memory region is updated to be equal to the lower half monitored memory region. The steps of updating, dividing, and counting memory accesses to the monitored memory region during a measurable interval are repeated for a number of iterations in order to identify a frequently accessed memory region. As a set of instruction executes in the processor, a performance monitor may count the memory accesses and provide the numbers for optimization analysis.

24 Claims, 5 Drawing Sheets

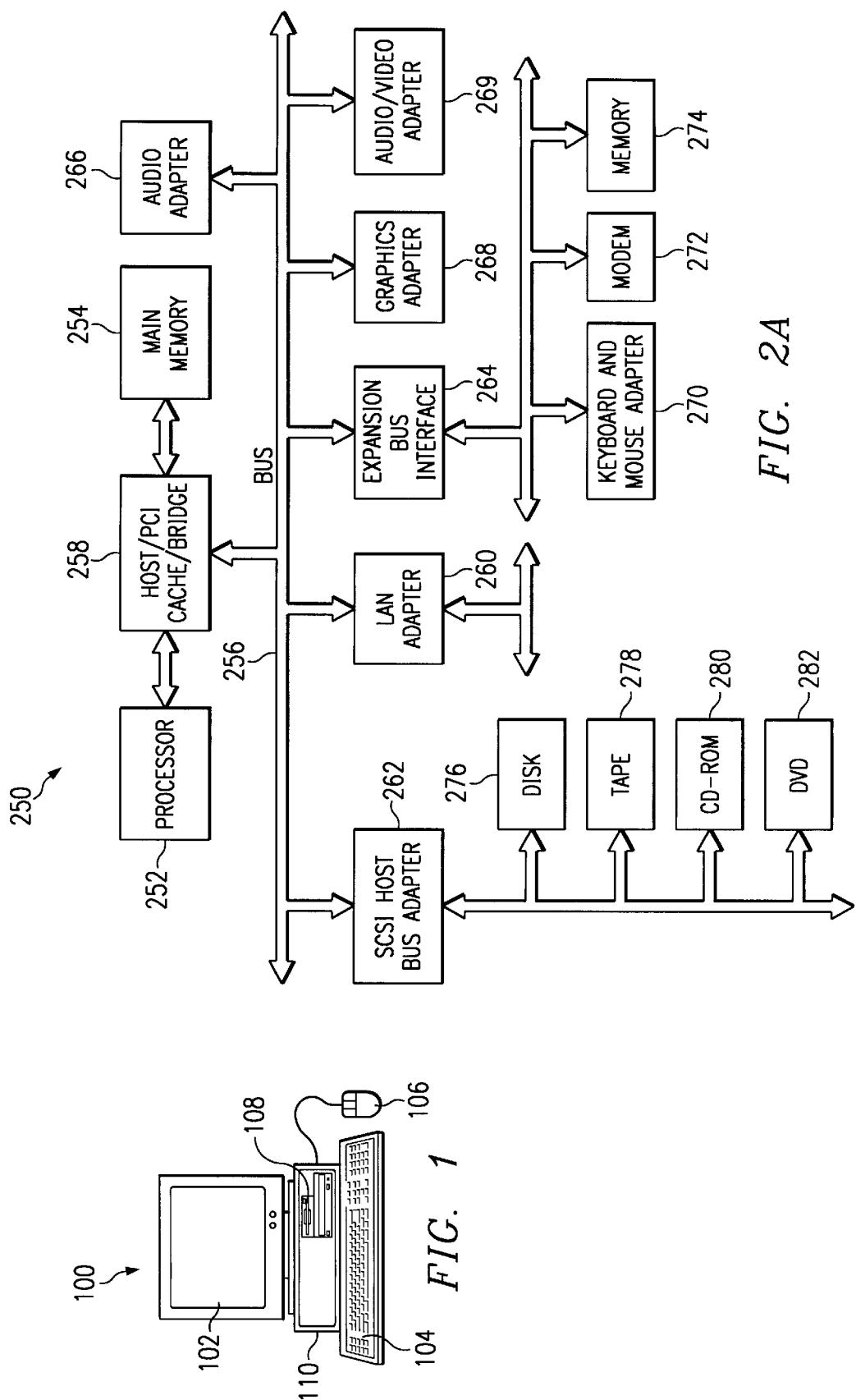

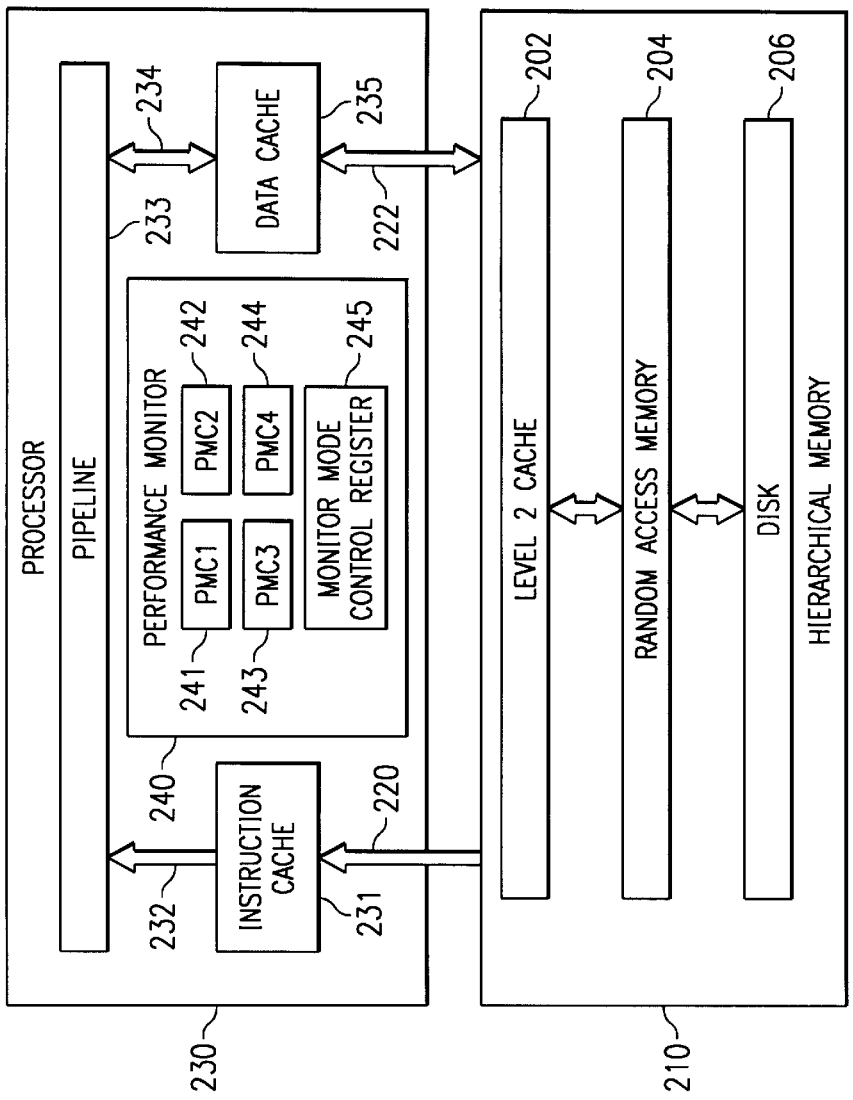

METHOD AND SYSTEM FOR DYNAMICALLY LOCATING FREQUENTLY ACCESSED MEMORY REGIONS OR LOCATIONS

BACKGROUND OF THE INVENTION

1. Technical Field

The present invention relates generally to an improved data processing system and, in particular, to a method and system for monitoring performance within a data processing system. Specifically, the present invention relates to a method and system for monitoring performance of storage access and control.

2. Description of Related Art

In typical computer systems, system developers desire optimization of software execution for more effective system design. Usually, studies are performed to determine system efficiency in a program's access patterns to memory and interaction with a system's memory hierarchy. Understanding the memory hierarchy behavior helps optimize the system through the development of algorithms that schedule and/or partition tasks as well as distribute and structure data.

Within state-of-the-art processors, facilities are often provided which enable the processor to count occurrences of software-selectable events and to time the execution of processes within an associated data processing system. These facilities are known as the performance monitor of the processor. Performance monitoring is often used to optimize the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. As another example, software engineers may utilize timing data from the performance monitor to optimize programs by relocating branch instructions and memory accesses. In addition, the performance monitor may be utilized to gather data about the access times to the data processing system's L1 cache, L2 cache, and main memory. Utilizing this data, system designers may identify performance bottlenecks specific to particular software or hardware environments. The information produced usually guides system designers toward ways of enhancing performance of a given system or of developing improvements in the design of a new system.

Events within the data processing system are counted by one or more counters within the performance monitor. The operation of such counters is managed by control registers, which are comprised of a plurality of bit fields. In general, both control registers and the counters are readable and writable by software. Thus, by writing values to the control register, a user may select the events within the data processing system to be monitored and specify the conditions under which the counters are enabled.

To evaluate the behavior of memory accesses by a processor, it is necessary to determine the locations of those memory accesses and the number of accesses that are consumed on behalf of executing instructions. In computer systems with hierarchical memory systems, the time required to access a given memory item depends on where in the memory hierarchy the memory item resides. Items that reside in the highest levels of the hierarchy tend to require less time to access than those in lower levels of the hierarchy. Since system performance tends to be decreased by increases in the average time to access memory items, it follows that the most frequently accessed memory items should be in the highest (fastest) points in the hierarchy.

Since the highest levels of the hierarchy usually have much less capacity that the lowest levels of the hierarchy, it usually is the case that not all of the most frequently accessed memory items will fit into the highest levels of the memory hierarchy. This occurs because of the alignment of the memory items in the memory address space, because of the stride of data items, or because the number of frequently accessed memory items is too large to fit into the highest levels of the hierarchy or for other reasons.

If the most frequently accessed memory items can be identified, engineers can focus on redesigning those aspects of the software responsible for the memory references in order to utilize the hierarchy more efficiently and thereby increase system performance. This is especially true in parallel or multiprocessor systems.

Previous solutions to identifying the most frequently accessed memory items have utilized simulation, software tracing (i.e., single step tracing), and hardware probes that access internal system busses. While all of these methods have some advantages, they all suffer from drawbacks. Tracing and simulation are very difficult and can induce distortion in the system execution. Hardware probe schemes can be very effective but must be designed into the system in a way that can detrimentally impact system physical packaging and cost.

Therefore, it would be advantageous to have a method and system for accurately monitoring the use of memory resources within a processor. It would be further advantageous to have a method and system for detecting a set of frequently accessed memory items using support structures within a processor.

SUMMARY OF THE INVENTION

The present invention provides a method and system for monitoring the performance of a processor to detect a set of frequently accessed memory items. A memory region to be monitored is selected and divided into an upper half monitored memory region and a lower half monitored memory region. Memory accesses to the upper half monitored memory region and memory accesses to the lower half monitored memory region are counted during a measurable interval. In response to the count of memory accesses to the upper half monitored memory region being greater than the count of memory accesses to the lower half monitored memory region, the monitored memory region is updated to be equal to the upper half monitored memory region. In response to the count of memory accesses to the lower half monitored memory region being greater than the count of memory accesses to the upper half monitored memory region, the monitored memory region is updated to be equal to the lower half monitored memory region. The steps of updating, dividing, and counting memory accesses to the monitored memory region during a measurable interval are repeated for a number of iterations in order to identify a frequently accessed memory region. As a set of instruction executes in the processor, a performance monitor may count the memory accesses and provide the numbers for optimization analysis.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a data processing system in which the present invention may be implemented;

FIG. 2A is a block diagram depicting a data processing system in which the present invention may be implemented;

FIG. 2B is a block diagram depicting selected internal functional units of a data processing system that may include the present invention;

FIG. 3 is an illustration depicting an example representation of one configuration of an MMCR suitable for controlling the operation of two PMCs;

DETAILED DESCRIPTION OF THE PREFERRED EMBODIMENT

Figure 4:
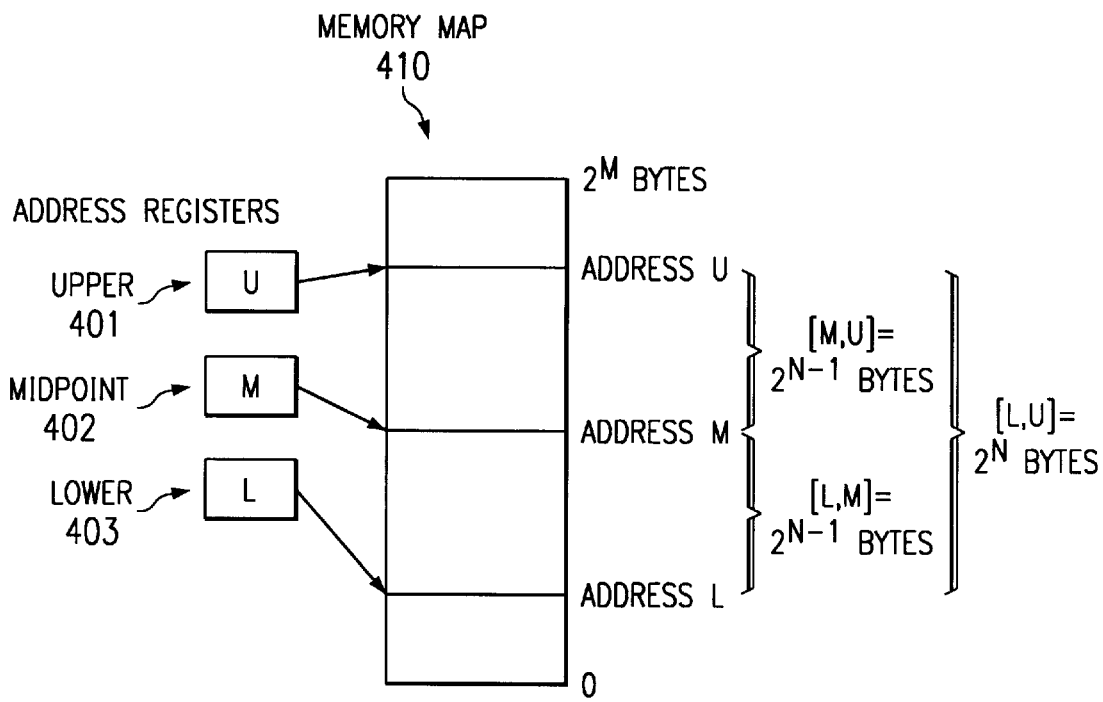
FIG. 4 is an illustration depicting the use of address registers to point to memory regions as shown in a memory map.

With reference now to FIG. 1, a pictorial representation depicts a data processing system in which the present invention may be implemented. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer. Although the depicted representation shows a personal computer, other embodiments of the present invention may be implemented in other types of data processing systems, such as mainframes, servers, workstations, network computers, Internet appliances, palm computers, etc. System unit 110 comprises memory, a central processing unit, I/O unit, etc. However, in the present invention, system unit 110 contains a speculative processor, either as the central processing unit or as one of multiple CPUs present in the system unit.

With reference now to FIG. 2A, a block diagram of a data processing system in which the present invention may be implemented is illustrated. Data processing system 250 is an example of a computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, CD-ROM 280, and DVD 282 in the depicted example. Typical PCI local bus implementations will support three or four PCI expansion slots or add-in connectors.

An operating system runs on processor 252 and is used to coordinate and provide control of various components within data processing system 250 in FIG. 2A. The operating system may be a commercially available operating system such as Java OS or OS/2, which are available from International Business Machines Corporation. An object oriented programming system such as Java may run in conjunction with the operating system and provides calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Often times, hard disk drives are absent and memory is constrained when data processing system 250 is used as a network client.

Those of ordinary skill in the art will appreciate that the hardware in FIG. 2A may vary depending on the implementation. For example, other peripheral devices, such as optical disk drives and the like may be used in addition to or in place of the hardware depicted in FIG. 2A. The depicted example is not meant to imply architectural limitations with respect to the present invention. For example, the processes of the present invention may be applied to a multiprocessor data processing system.

With reference now to FIG. 2B, a block diagram depicts selected internal functional units of a data processing system that may include the present invention. System 200 comprises hierarchical memory 210 and processor 230. Hierarchical memory 210 typically comprises one or more Level 1 caches such as Instruction Cache 231, Data cache 235, Level 2 cache 202, random access memory (RAM) 204, and disk 206. The Level 1 caches 231 and 235 typically provide the fastest access to data and instructions that may be stored in the L2 cache 202 or RAM 204 in a manner which is well-known in the art. Although only two levels of cache are described, any number Levels of cache may be implemented in a manner which is well-known in the art. RAM 204 provides main memory storage for data and instructions that may also provide a cache for data and instructions stored on nonvolatile disk 206.

Data and instructions may be transferred to processor 230 from hierarchical memory 210 on instruction transfer path 220 and data transfer path 222. Instruction transfer path 220 and data transfer path 222 may be implemented as a single bus or as separate buses between processor 230 and hierarchical memory 210. Alternatively, a single bus may transfer data and instructions between processor 230 and hierarchical memory 210 while processor 230 provides separate instruction and data transfer paths within processor 230, such as instruction bus 232 and data bus 234.

Processor 230 also comprises instruction cache 231, data cache 235, performance monitor 240, and instruction pipeline 233. Performance monitor 240 comprises performance monitor counter (PMC1) 241, performance monitor counter (PMC2) 242, performance monitor counter (PMC3) 243, performance monitor counter (PMC4) 244, and monitor mode control register (MMCR) 245. Alternatively, processor 230 may have other counters and control registers not shown.

Processor 230 includes a pipelined processor capable of executing multiple instructions in a single cycle, such as the PowerPC family of reduced instruction set computing (RISC) processors. During operation of system 200, instructions and data are stored in hierarchical memory 210. Instructions to be executed are transferred to instruction pipeline 233 via instruction cache 231. Instruction cache 231 contains instructions that have been cached for execution within pipeline 233. Some instructions transfer data to or from hierarchical memory 210 via data cache 235. Other instructions may operate on data loaded from memory or may control the flow of instructions.

Performance monitor 240 comprises event detection and control logic, including PMC1–PCM4 241-244 and MMCR 245. Performance monitor 240 is a software-accessible mechanism intended to provide detailed information with significant granularity concerning the utilization of processor instruction execution and storage control. The performance monitor may include an implementation-dependent number of performance monitor counters (PMCs) used to count processor/storage related events. These counters may also be termed "global counters". The MMCRs establish the function of the counters with each MMCR usually controlling some number of counters. The PMCS and the MMCRs are typically special purpose registers physically residing on the processor. These registers are accessible for read or write operations via special instructions for that purpose. The write operation is preferably only allowed in a privileged or supervisor state, while reading is preferably allowed in a problem state since reading the special purpose registers does not change a register's content. In a different embodiment, these registers may be accessible by other means such as addresses in I/O space. In the preferred embodiment, PMC1–PMC4 are 32-bit counters and MMCR is a 32-bit register. One skilled in the art will appreciate that the size of the counters and the control registers are dependent upon design considerations, including the cost of manufacture, the desired functionality of processor 230, and the chip area available within processor 230.

Performance monitor 240 monitors the entire system and accumulates counts of events that occur as the result of processing instructions. In the present invention, processor 230 allows instructions to execute out-of-order with respect to the order in which the instructions were coded by a programmer or were ordered during program compilation by a compiler. Processor 230 may also employ speculative execution to predict the outcome of conditional branches of certain instructions before the data on which the certain instructions depend is available. The MMCRs are partitioned into bit fields that allow for event/signal selection to be recorded/counted. Selection of an allowable combination of events causes the counters to operate concurrently.

When the performance monitor is used in conjunction with storage control, the performance monitor may be used as a mechanism to monitor memory usage via a selection of events in which a region of memory for a memory access is detected, as provided in the present invention described in further detail below.

With reference now to FIG. 3, an illustration provides an example representation of one configuration of an MMCR suitable for controlling the operation of two PMCs. As shown in the example, an MMCR is partitioned into a number of bit fields whose settings select events to be counted, enable performance monitor interrupts, and specify the conditions under which counting is enabled.

Alternatively, an MMCR may set an initialization value. The initialization value is both variable and software selectable. The initialization value may be loaded into a table or register when an instruction is first scheduled for execution. For example, given that an event under study is "register accesses", if the initialization value denotes a number of register accesses for an associated instruction, then completion of the instruction allows the number of register accesses for the particular instruction to be added to the total event count in a PMC that counts all register accesses by all instructions. Of course, depending on the data instruction being executed, "complete" may have different meanings. For example, for a "load" instruction, "complete" indicates that the data associated with the instruction was received, while for a "store" instruction, "complete" indicates that the data was successfully written. A user-readable counter, e.g., PMC1, then provides software access of the total number of register accesses since PMC1 was first initialized. With the appropriate values, the performance monitor is readily configured for use in identifying a variety of system performance characteristics.

Bits 0–4 and 18 of the MMCR in FIG. 3 determine the scenarios under which counting is enabled. By way of example, bit 0 may be a freeze counting bit such that when the bit is set, the values in the PMCs are not changed by hardware events, i.e. counting is frozen. Bits 1–4 may indicate other specific conditions under which counting is performed. Bits 5, 16, and 17 are utilized to control interrupt signals triggered by PMCs. Bits 6–15 may be utilized to control time or event-based transitions. Bits 19–25 may be used for event selection for PMC1, i.e. selection of signals to be counted for PMC1. Bits 26–31 may be used for event selection for PMC2, i.e. selection of signals to be counted for PMC2. The function and number of bits may be chosen as necessary for selection of events as needed within a particular implementation.

At least one counter may be required to capture data for some type of performance analysis. More counters provide for faster or more accurate analysis. If the monitored scenario is strictly repeatable, the same scenario may be executed with different items being selected. If the scenario is not strictly repeatable, then the same scenario may be executed with the same item selected multiple times to collect statistical data. The time from the start of the scenario is assumed to be available via system time services so that intervals of time may be used to correlate the different samples and different events.

The present invention discloses how a simple extension to existing processors with performance monitors can identify the most frequently accessed memory items. This solution utilizes a combination of hardware and software elements. The central hardware element consists of an address range detector that enables the construction of an efficient search algorithm. The address range detector has the ability to self-adjust its detection range to a desired subset of the initial range according to the number and relative position of memory references that fall in the initial range over a measurable interval. This process of self-adjustment is herein termed "self-homing". A set of software instructions, such as software operating in conjunction with a performance monitor, can then employ this self-homing address range detector to dynamically locate the most frequently accessed addresses in a given workload.

With reference now to FIG. 4, an illustration depicts the use of address registers to point to memory regions as shown in a memory map. The address range detector consists primarily of a memory address comparator circuit and three registers 401–403, Upper 401, Lower 403, and Midpoint 402, that define the upper, lower, and midpoint addresses of a specific address range. Memory address comparator circuits, such as those that provide for bus snooping, are well-known in the art and are not further described herein.

The values of registers 401–403 are address U, address M, and address L, respectively. The pertinent address ranges so defined are: the full address range between Upper and Lower, referred to as [L,U]; the upper half of the full address range is referred to as [M,U]; and the lower half of the full address range is referred to as [L,M]. The respective addresses and address ranges are shown in memory map 410. In the preferred implementation, the address points L and U are chosen such that the span of the range of addresses [L,U] will be a power of two (e.g., $2^N$ bytes) insuring that the midpoint address M can be easily computed rather than explicitly stored as required. These registers are to be examined by address comparison logic that can detect the cases in which the address of a memory access falls into the upper half [M,U], into the lower half [L,M], or does not fall in the range [L,U].

Figure 5:
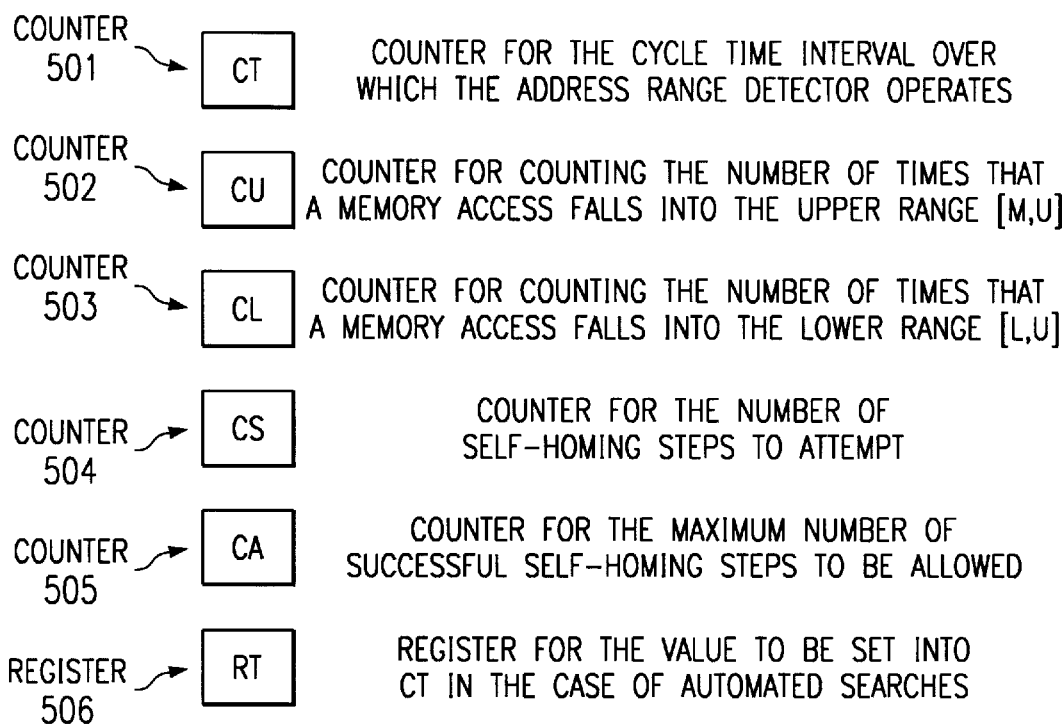
FIG. 5 is an illustration depicting some of the address range detector elements used during the address range detection process.

With reference now to FIG. 5, an illustration depicts some of the address range detector elements used during the address range detection process. These consist of five counters and one register. The first counter CT, counter 501, is used to define a time interval over which the range detection circuit operates. The time quanta may vary depending upon the hardware implementation or the needs of the performance analysis. For example, the time units may be processor cycles, bus cycles, seconds, fractions of seconds, etc.

The second counter CU, counter 502, counts the number of times that a memory access falls into the upper range. The third counter CL, counter 503, counts the number of times that a memory access falls into the lower range. The fourth counter CS, counter 504, defines the number of self-homing steps to attempt. The fifth counter CA, counter 505, defines the maximum number of successful self-homing steps be allowed, or equivalently, the number of self-homing iterations. As will be explained further below, the register RT, register 506, contains the value to be set into CT in the case of automated searches.

Figure 6A:
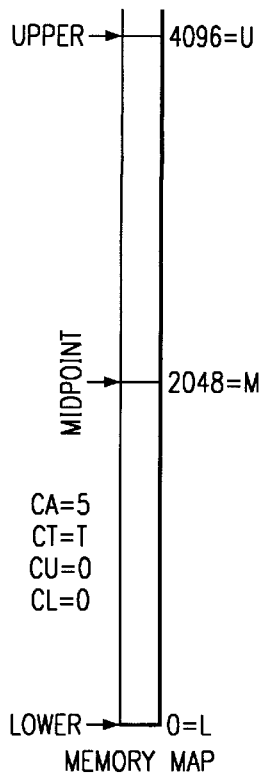
FIGS. 6A–6G are illustrations depicting a memory map showing a series of self-homing steps for the process of the present invention.

With reference now to FIGS. 6A–6G, an illustration depicts a memory map showing a series of self-homing steps for the process of the present invention. As an example, the steps leading to the identification of the most active cache line of the first page of memory will be identified. For this example, cache lines are chosen to be 128 bytes in size and pages are chosen to be 4096 bytes in length. As shown in FIG. 6A, address U is thus initially set to 4096 in register Upper, address L is initially set to zero in register Lower (so that [L,U] is the first page of memory). Correspondingly, midpoint address M is initially set to 2048 in register Midpoint. A time span of T time units is initially set into counter CT while counters CU and CL are initially set to zero. In this case, counter CA is initially set to 5 so that the maximum number of adjustments to registers Upper and Lower will be 5. Alternatively, counter CA may be loaded with the number of adjustments remaining so that counter CA contains zero when performing the last self-homing iteration.

Now when the range detector is enabled, the counter CT counts down from T towards zero. While CT is down counting, the address range detector examines each address issued to the memory system. If the address is between U=4096 and M=2048 (i.e., in address range [M,U]), then counter CU is incremented to denote this fact. Likewise, if the address is between L=0 and M=2048 (i.e., in address range [L,M]), then the counter CL is incremented to denote this fact. The self-homing step is complete when either CT reaches zero or when either CU or CL reach their maximum value (as dictated by a particular embodiment).

At the end of the first self-homing step, three cases apply. If CU is greater than CL, then most of the accesses to the address range [L,U] would have been to the upper half of the range [M,U]. For the next self-homing step, lower address L would be replaced with the original midpoint address M.

If CU is less than CL, then most of the memory accesses would have been to the lower half of the range [L,M]. For the next self-homing step, U would be replaced with the original midpoint M.

If neither of these two cases occurred, then the boundary case with CU equal to CL has occurred. In this case, a few reasonable actions could be performed. One alternative would be to repeat the current iteration for not more than CA times until resigning the entire effort, in which case a separate counter would be required to keep track of the number of retries. Another alternative would be to alternate a bias between the two halves, in which case a flag could be used to indicate in which half of the memory region of interest a biased decision was previously made so that the next biased decision could be made in the opposing half of the memory region of interest.

The simplest alternative is that the comparison between the count of references of the two halves of memory would be made via a greater-than-or-equal-to comparison or equally well, a less-than-or-equal-to comparison so that an equal number of memory accesses to each half is automatically biased in one direction or another. The choice between the possible actions may be selected as best suits an actual implementation.

Figure 6B:
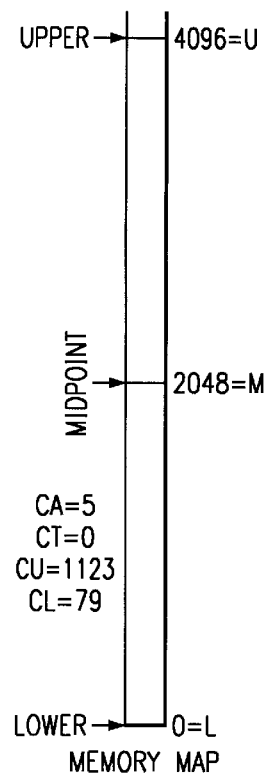

FIG. 6B shows an example of the results at the end of a first self-homing step in which CU is equal to 1123, i.e., [M,U] has had 1123 memory accesses, and CL is equal to 79, i.e., [L,M] has had 79 memory accesses. Hence, the memory region of interest moves towards the upper range of memory.

At this point, the process has identified the half of the memory interval [L,U] in which most of the memory accesses occurred.

Figure 6C:
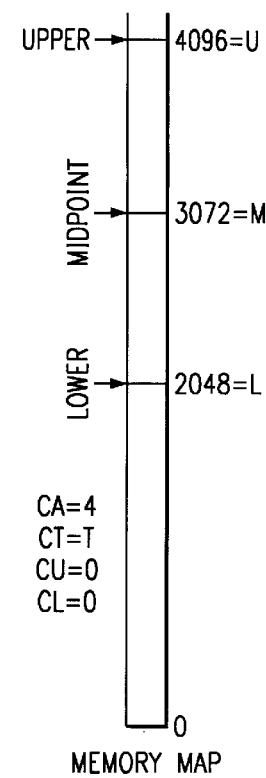

FIG. 6C shows the resetting of the counters and registers with the appropriate values in preparation for the second self-homing step. Once U and L have been altered appropriately, the process can perform another self-homing iteration.

Figure 6D:
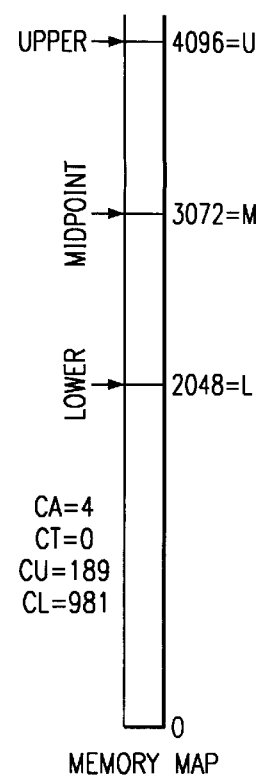

FIG. 6D shows an example of the results at the end of a second self-homing step in which CU is equal to 189, i.e., [M,U]) has had 189 memory accesses, and CL is equal to 981, i.e., [L,M] has had 981 memory accesses. Hence, the memory region of interest moves towards the lower range of memory.

Figure 6E:
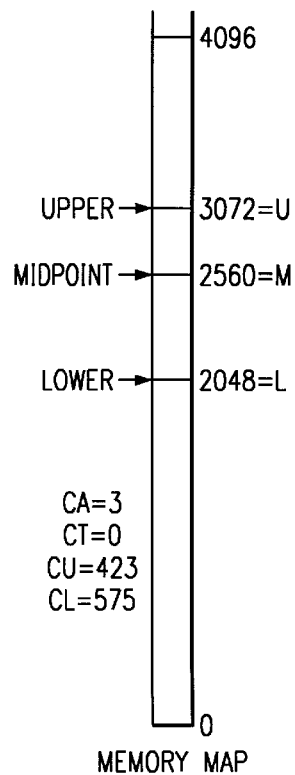

FIG. 6E shows an example of the results at the end of a third self-homing step in which CU is equal to 423, i.e., [M,U] has had 423 memory accesses, and CL is equal to 575, i.e., [L,M] has had 575 memory accesses. Hence, the memory region of interest moves towards the lower range of memory.

Figure 6F:
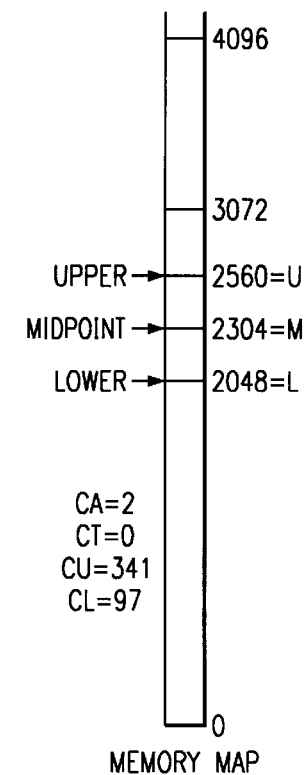

FIG. 6F shows an example of the results at the end of a fourth self-homing step in which CU is equal to 341, i.e.,

[M,U] has had 341 memory accesses, and CL is equal to 97, i.e., [L,M] has had 97 memory accesses. Hence, the memory region of interest moves towards the upper range of memory.

Figure 6G:
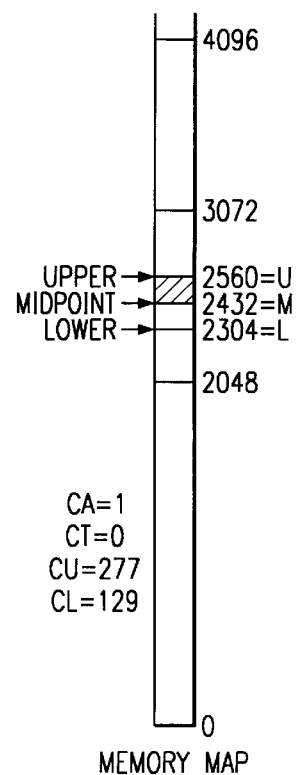

FIG. 6G shows an example of the results at the end of a fifth self-homing step in which CU is equal to 277, i.e., [M,U] has had 277 memory accesses, and CL is equal to 129, i.e., [L,M] has had 129 memory accesses. In this final iteration, the memory region of interest is the upper range of memory. In this case, the region of interest is the 128 byte cache line [2432,2560].

In this example, five self-homing iterations (CA initially set to 5) are performed to identify the most frequently accessed 128 byte cache line of a 4096 page of memory. It should be noted that the self-homing process of the present invention is not limited to identifying a cache line - any suitable addressable unit of memory may be selected by suitable settings of Lower, Upper and CA. Likewise, the range identified can be larger than a cache line, e.g., a memory page or a memory segment.

During the iteration process, the process reinitializes the registers and counters for each next homing iteration except for the last iteration. In the implementation shown in FIG. 5, counter CT is reloaded with the value stored in register RT, and counters CU and CL are reinitialized to zero. After the last iteration, the values CU and CL may be preserved since they give the access counts of the final range [L,U]. The value of CT may also be preserved if the iteration was ended by one of the counters CU or CL reaching a maximum value, which would allow a computation of the memory access frequency per unit of time based on the value remaining in counter CT.

The reloading and reiterating can be accomplished via software or hardware, but a significant increase in speed may be obtained by allowing hardware to manage the iteration. Assuming that hardware iteration is supported, software can still micro-manage the sequence of self-homing iterations if it sets the maximum allowable number of adjustments to one (i.e., by setting CA equal to 1).

When the end of the entire self-homing process has occurred, an interrupt is preferably presented, such as a performance monitor interrupt. The service routine may carry out any desired management steps in response to the interrupt. In particular, when a range of memory has been analyzed, the service routine may examine a different starting range of memory or may repetitively consider the same range of memory to accumulate a record of so discovered address ranges for subsequent statistical analysis. It would also be appropriate to record the pertinent residual counter values such as CT, CU, and CL.

With the self-homing process of the present invention, software management may be applied to perform the process on large sections of memory. By dividing a large memory address range into a convenient number of regions, the memory regions are inspected one at a time with the self-homing address range detector. The process proceeds by splitting the initial region of interest into finer grain regions according to which range of locations has the greatest number of accesses. The region with the highest number of accesses is made the new region of interest.

Continuing with the example shown in FIGS. 6A–6G, The software management aspect of this process can choose to search deeper and to identify the most frequently accessed word in the cache line or can find the next most frequently accessed cache line within the page. If resolution to the word is required, the self-homing iteration is simply continued until the desired word is found. If the second most accessed cache line within the example page is to be found, the algorithm is repeated by fragmenting the page into chunks that lie in close proximity to the most accessed cache line and examining each of these chunks for the most accessed cache lines within the chunks.

Assuming an embodiment that deals with block sizes that are powers of two in size, as a specific example of this fragmentation, suppose in a memory page [0,4096] that the most frequently accessed cache line is [3968,4096]. The remaining portion of the memory page may be studied by examining the following fragments: [0,2048], [2048,3072], [3072,3584], and [3584,3840]. Each of these fragments may prove to have memory items of interest and may warrant examination. Each such examination will leave more fragments to investigate, so potentially there may be many fragments to investigate. However, it is not necessary to apply the self-homing process to all the fragments. It is usually not necessary to determine the access frequency of every cache line in system memory. Usually, only the top ten or so most frequently accessed addresses are needed to obtain a sufficiently detailed understanding of memory usage for analyzing a particular processor workload. Hence, it would not be necessary to fragment the entire memory space.

It is worth mentioning that the self-homing process can be used to count the number of accesses to a specific desired block of memory, such as a given cache line, by suitable settings of L and U and with a setting of CA equal to one. In this case, only one self-homing iteration would be performed. Since the values of CU and CL are preserved, the number of accesses that occurred in CT time units would be known. If this process is employed with processors that have performance monitoring counters, then the total number of memory accesses can be known for a given range of memory. Hence, the contribution of the identified address to the total could be known.

Alternatively, the address range [L,U] could be set to span all of memory with a single self-homing iteration (i.e., CA equal to 1). In that case, all memory accesses to the entire memory range will be counted in the sum of the final values stored in CU and CL.

The implementation of the range detection function can be simplified in a processor possessing performance monitor counters or address comparison registers, e.g. a Data Address Breakpoint Register (DABR) or an Instruction Address Breakpoint Register (IABR). The counters CT, CU, CL, CA, and CS can be performance monitor counters or registers. An interrupt for the completion of a self-homing iteration can be accomplished with the performance monitor interrupt hardware, such as the Monitor Mode Control Register (MMCR). By combining the performance monitor functionality with the range detection functionality, the overall implementation cost is held to a minimum.

It is clear that this mechanism works best with workloads that exhibit some form of repeatability. However, this is not a limitation since the application of the detection of most frequently accessed addresses would only be applied to workloads that exhibit some form of repeatability. Also, because the rate at which homing sequences complete can be adjusted by suitable settings of CT (i.e., the measurable interval allowed per self-homing iteration), the overhead associated with saving an identified range can be reduced to a modest level by controlling the frequency of the interrupts with CT. Consequently, the self-homing process can be run continuously with minimal impact to the running workload. In this case, if each self-homing iteration is time-stamped, the cyclic nature of a particular workload can be identified even if the regeneration points of the workload are broadly spaced.

It should be noted that the present invention has been described using examples in which each self-homing iteration occurred within a specified temporal interval. For example, FIG. 5 describes counter RT that is used to define a time interval over which the range detection circuit operates. This time interval does not have to be uniform from one self-homing iteration to the next iteration. Counter RT may be loaded with a different number of time units for each self-homing iteration, if necessary, as dictated by the needs of a performance analysis, etc.

In addition, although the previous examples described the present invention using specified time intervals, it was stated above that a self-homing iteration occurs within a measurable interval. The measurable interval for a self-homing iteration may be measured in units other than time quanta, such as a count of system events. For example, each self-homing iteration may be limited to the time period required for N memory accesses to occur. Although the length of time during which N memory accesses occur may vary from one self-homing iteration to the next, different types of measuring units may be useful for different purposes, e.g., when performing benchmark tests. Other system events may include interrupts, disk requests, etc. For these types of measuring units, the actual elapsed time for the number of system events could be provided by a separate hardware timer or counter.

Figure 7:
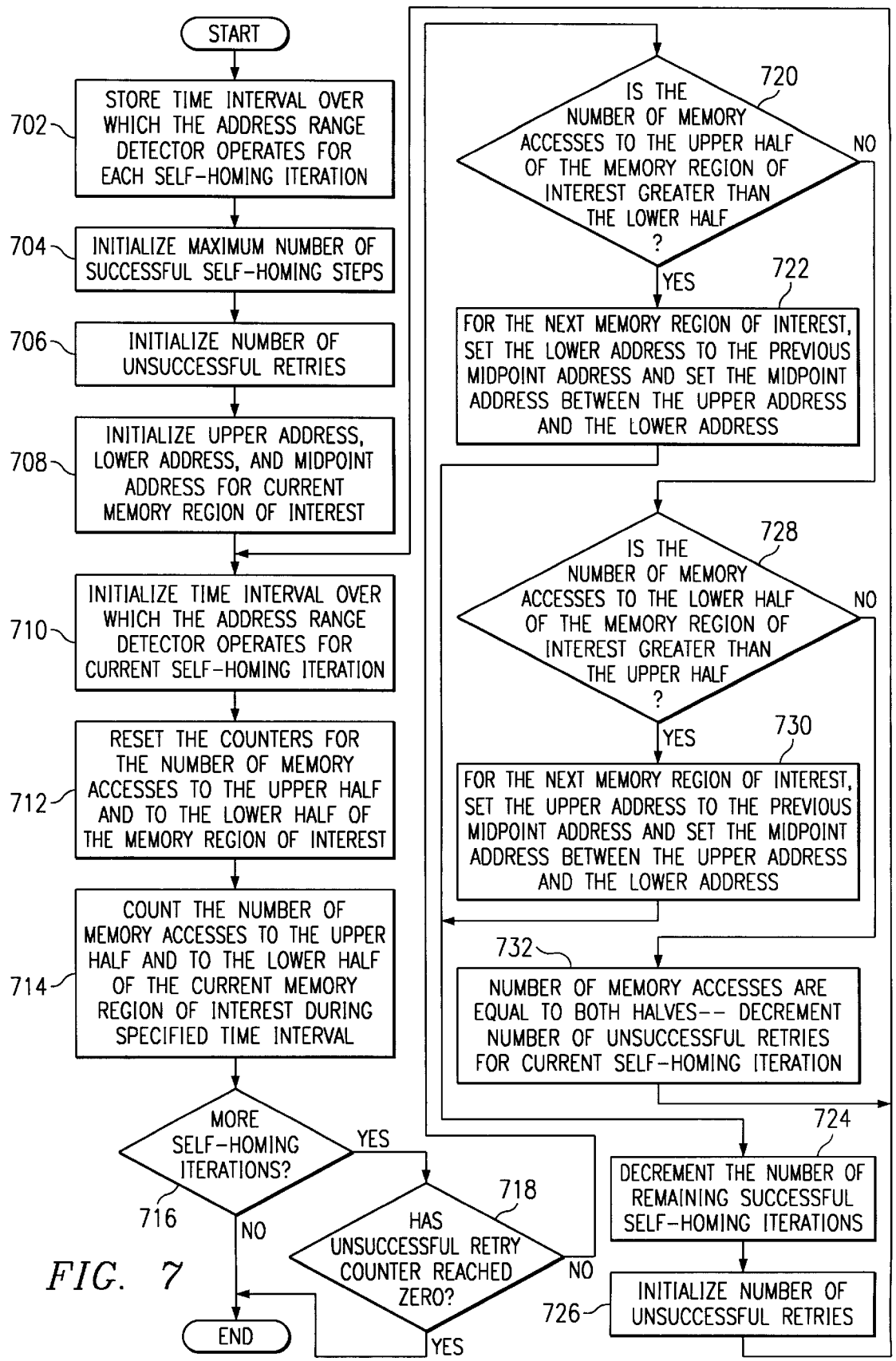
FIG. 7 is a flowchart depicting the self-homing process for dynamically locating frequently accessed memory regions or locations according to the method of the present invention.

With reference now to FIG. 7, a flowchart depicts the self-homing process for dynamically locating frequently accessed memory regions or locations according to the method of the present invention. The process begins with the storage of a time interval over which the address range detector operates for each self-homing iteration (step 702). During the specified time interval, the memory address of each memory access is inspected through an appropriate means, such as bus snooping, etc. A maximum number of successful self-homing steps or iterations is initialized (step 704), which provides a count of the number of times that the memory region of interest is adjusted in order to narrow the range of memory addresses. A number of unsuccessful retries is also initialized (step 706), which provides a count of the number of iterations to be attempted if the number of memory accesses is equal in both the upper and the lower half of the memory region of interest. A set of pointers or registers is then initialized for the upper address value, the lower address value, and the midpoint address value for the initial memory region of interest (step 708). This is an overall memory region in which one is interested in finding the most frequently accessed memory locations.

The previously stored time interval is then initialized in a countdown register or other appropriate location for providing a limit on the amount of time for which the current self-homing iteration operates (step 710). The counters are reset for the number of memory accesses to the upper half and to the lower half of the memory region of interest (step 712). The number of memory accesses to the upper half and to the lower half of the memory region of interest are then counted using the appropriate hardware (step 714). The counting process occurs for the amount of time previously specified.

A determination is then made as to whether there are additional self-homing iterations to be attempted (step 716). If not, then the process is completed. If there are more iterations, then a determination is made as to whether the unsuccessful retry counter has reached zero (step 718), i.e., whether there are additional retries to be made in the case that the number of memory accesses are falling equally within both halves of a memory region of interest. If the retry counter has reached zero, then the process terminates, in which case an appropriate interrupt or indication can be made to notify the performance monitor of the reason for termination.

If the retry counter has not reached zero, then a determination is made as to whether the number of memory accesses to the upper half of the memory region of interest is greater than the lower half (step 720). If so, then in preparation for the next iteration, the lower address is updated to the midpoint of the previous iteration, and the midpoint address is updated to point between the upper address and the updated lower address (step 722). The number of remaining self-homing iterations is decremented to indicate that a self-homing iteration has successfully completed (step 724). Since the previous iteration was successful, the number of retries is also initialized in case the previous iteration was unsuccessful or in case the next iteration is unsuccessful (step 726). The process then loops back to step 710 to complete another iteration.

If the number of memory accesses to the upper half of the memory region of interest is not greater than the lower half, then a determination is made as to whether the number of memory accesses to the lower half of the memory region of interest is greater than the upper half (step 728). If so, then in preparation for the next iteration, the upper address is updated to the midpoint of the previous iteration, and the midpoint address is updated to point between the updated upper address and the lower address (step 730). The number of remaining self-homing iterations is decremented to indicate that a self-homing iteration has successfully completed (step 724). Since the previous iteration was successful, the number of retries is also initialized in case the previous iteration was unsuccessful or in case the next iteration is unsuccessful (step 726). The process then loops back to step 710 to complete another iteration.

If the number of memory accesses to the upper half of the memory region of interest is not greater than the lower half, and if the number of memory accesses to the lower half of the memory region of interest is not greater than the upper half, then the number of memory accesses to each half of the memory region of interest are equal. As noted previously, this special case may be handled in a variety of ways. In this example, a retry counter is used to limit the number of possible unsuccessful self-homing iterations. The retry counter is set, decremented, and reset as needed. At this point in the process, the appropriate counter or register is decremented for the current self-homing iteration (step 732), and the process then loops back to step 710 to complete another iteration.

The advantages provided by the present invention are apparent in light of the detailed description of the invention provided above. The present invention discloses how a simple extension to existing processors with performance monitors can identify the most frequently accessed memory items inexpensively, without requiring external instrumentation. The present invention can find the needed addresses without significantly perturbing system execution. In addition, a performance monitor is accessible via software, and the required data may be provided for software analysis.

This method can be used with systems having multiple processors either to track processor specific or system wide memory references. Although the examples nominally considered all traffic, this is not necessary. It would be useful in an SMP system to consider only those atomic references that were modified in some other processor's cache and, in this way, assist in the analysis of lock utilization.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring memory accesses in a data processing system, the method comprising the computer-implemented steps of:

selecting a monitored memory region;

dividing the monitored memory region into an upper half monitored memory region and a lower half monitored memory region; and counting memory accesses within a measurable interval to the upper half monitored memory region and memory accesses to the lower half monitored memory region.

2. The method of claim 1 further comprising:

in response to the count of memory accesses to the upper half monitored memory region being greater than the count of memory accesses to the lower half monitored memory region, updating the monitored memory region to be equal to the upper half monitored memory region;

in response to the count of memory accesses to the lower half monitored memory region being greater than the count of memory accesses to the upper half monitored memory region, updating the monitored memory region to be equal to the lower half monitored memory region;

dividing the updated monitored memory region into an upper half updated monitored memory region and a lower half updated monitored memory region; and counting memory accesses within a measurable interval to the upper half updated monitored memory region and memory accesses to the lower half updated monitored memory region.

3. The method claim of 2 further comprising:

repeating, for a number of iterations, the steps of updating the updated monitored memory region, dividing the updated monitored memory region, and counting memory accesses within a measurable interval in the updated monitored memory region.

4. The method claim of 3 further comprising:

in response to the count of memory accesses to the upper half updated monitored memory region being greater than the count of memory accesses to the lower half monitored memory region, identifying the upper half updated monitored memory region as a most frequently accessed memory region;

in response to the count of memory accesses to the lower half updated monitored memory region being greater than the count of memory accesses to the upper half monitored memory region, identifying the lower half updated monitored memory region as a most frequently accessed memory region.

5. The method claim of 3 further comprising:

selecting the measurable interval; and selecting the number of iterations.

6. The method claim of 3 wherein the measurable interval is identical for each iteration.

7. The method claim of 3 wherein a processor in the data processing system comprises a performance monitor for counting memory accesses to memory regions.

8. The method claim of 3 further comprising:

retrieving the count of memory accesses to the upper half updated monitored memory region and the count of memory accesses to the lower half updated monitored memory region for analysis by a set of instructions.

9. A data processing system for monitoring memory accesses, the data processing system comprising:

first selecting means for selecting a monitored memory region;

first dividing means for dividing the monitored memory region into an upper half monitored memory region and a lower half monitored memory region; and first counting means for counting memory accesses within a measurable interval to the upper half monitored memory region and memory accesses to the lower half monitored memory region.

10. The data processing system of claim 9 further comprising:

first updating means for updating, in response to the count of memory accesses to the upper half monitored memory region being greater than the count of memory accesses to the lower half monitored memory region, the monitored memory region to be equal to the upper half monitored memory region;

second updating means for updating, in response to the count of memory accesses to the lower half monitored memory region being greater than the count of memory accesses to the upper half monitored memory region, the monitored memory region to be equal to the lower half monitored memory region;

second dividing means for dividing the updated monitored memory region into an upper half updated monitored memory region and a lower half updated monitored memory region; and second counting means for counting memory accesses within a measurable interval to the upper half updated monitored memory region and memory accesses to the lower half updated monitored memory region.

11. The data processing system of claim 10 further comprising:

repeating means for repeating in the updated monitored memory region, for a number of iterations and within a measurable interval, the functions of the first and second updating means, the second dividing means, and the third counting means.

12. The data processing system of claim 11 further comprising:

first identifying means for identifying, in response to the count of memory accesses to the upper half updated monitored memory region being greater than the count of memory accesses to the lower half monitored memory region, the upper half updated monitored memory region as a most frequently accessed memory region;

second identifying means for identifying, in response to the count of memory accesses to the lower half updated monitored memory region being greater than the count of memory accesses to the upper half monitored memory region, the lower half updated monitored memory region as a most frequently accessed memory region.

13. The data processing system of claim 11 further comprising:

second selecting means for selecting the measurable interval; and third selecting means for selecting the number of iterations.

14. The data processing system of claim 11 wherein the measurable interval is identical for each iteration.

15. The data processing system of claim 11 wherein a processor in the data processing system comprises a performance monitor for counting memory accesses to memory regions.

16. The data processing system of claim 11 further comprising:

retrieving means for retrieving the count of memory accesses to the upper half updated monitored memory region and the count of memory accesses to the lower half updated monitored memory region for analysis by a set of instructions.

17. A computer program product on a computer-readable medium for use in a data processing system for monitoring memory accesses, the computer program product comprising:

first instructions for selecting a monitored memory region;

second instructions for dividing the monitored memory region into an upper half monitored memory region and a lower half monitored memory region; and third instructions for counting memory accesses within a measurable interval to the upper half monitored memory region and memory accesses to the lower half monitored memory region.

18. The computer program product of claim 17 further comprising:

instructions for updating, in response to the count of memory accesses to the upper half monitored memory region being greater than the count of memory accesses to the lower half monitored memory region, the monitored memory region to be equal to the upper half monitored memory region;

instructions for updating, in response to the count of memory accesses to the lower half monitored memory region being greater than the count of memory accesses to the upper half monitored memory region, the monitored memory region to be equal to the lower half monitored memory region;

instructions for dividing the updated monitored memory region into an upper half updated monitored memory region and a lower half updated monitored memory region; and instructions for counting memory accesses within a measurable interval to the upper half updated monitored memory region and memory accesses to the lower half updated monitored memory region.

19. The computer program product of claim 18 further comprising:

instructions for repeating, for a number of iterations, the instructions for updating the updated monitored memory region, the instructions for dividing the updated monitored memory region, and the instructions for counting memory accesses within a measurable interval in the updated monitored memory region.

20. The computer program product of claim 19 further comprising:

instructions for identifying, in response to the count of memory accesses to the upper half updated monitored memory region being greater than the count of memory accesses to the lower half monitored memory region, the upper half updated monitored memory region as a most frequently accessed memory region;

instructions for identifying, in response to the count of memory accesses to the lower half updated monitored memory region being greater than the count of memory accesses to the upper half monitored memory region, the lower half updated monitored memory region as a most frequently accessed memory region.

21. The computer program product of claim 19 further comprising:

instructions for selecting the measurable interval; and instructions for selecting the number of iterations.

22. The computer program product of claim 19 wherein the measurable interval is identical for each iteration.

23. The computer program product of claim 19 wherein a processor in the data processing system comprises a performance monitor for counting memory accesses to memory regions.

24. The computer program product of claim 19 further comprising:

instructions for retrieving the count of memory accesses to the upper half updated monitored memory region and the count of memory accesses to the lower half updated monitored memory region for analysis by a set of instructions.

* * * * *